(12) United States Patent
Kuramoto et al.

(10) Patent No.: US 10,377,070 B2
(45) Date of Patent: Aug. 13, 2019

(54) METHOD FOR MANUFACTURING BEARING CAGE

(71) Applicant: NSK LTD., Tokyo (JP)

(72) Inventors: Yoshikazu Kuramoto, Fujisawa (JP); Nariaki Aihara, Fujisawa (JP); Takayuki Hiramoto, Fujisawa (JP)

(73) Assignee: NSK LTD., Tokyo (JP)

( * ) Notice: Subject to any disclaimer, the term of this patent is extended or adjusted under 35 U.S.C. 154(b) by 0 days.

(21) Appl. No.: 16/077,884

(22) PCT Filed: Feb. 26, 2016

(86) PCT No.: PCT/JP2016/055912
§ 371 (c)(1),
(2) Date: Aug. 14, 2018

(87) PCT Pub. No.: WO2017/145384
PCT Pub. Date: Aug. 31, 2017

(65) Prior Publication Data
US 2019/0054673 A1 Feb. 21, 2019

(51) Int. Cl.
*F16C 33/41* (2006.01)
*F16C 33/49* (2006.01)
(Continued)

(52) U.S. Cl.
CPC ...... *B29C 45/2708* (2013.01); *B29C 45/0025* (2013.01); *B29C 45/0046* (2013.01);
(Continued)

(58) Field of Classification Search
CPC ........ F16C 33/41; F16C 33/416; F16C 33/49; F16C 33/496; F16C 2208/04;
(Continued)

(56) References Cited

U.S. PATENT DOCUMENTS

| 4,668,209 A | * | 5/1987 | Kyoosei | B29C 45/0046 264/328.12 |
| 5,941,704 A | * | 8/1999 | Arai | A61C 1/181 384/523 |

(Continued)

FOREIGN PATENT DOCUMENTS

| CN | 102471820 A | 5/2012 |
| CN | 104694729 A | 6/2015 |

(Continued)

OTHER PUBLICATIONS

Search Report dated May 17, 2016, issued by the International Searching Authority in International Application No. PCT/JP2016/055912 (PCT/ISA/210).

(Continued)

*Primary Examiner* — Phillip A Johnson
(74) *Attorney, Agent, or Firm* — Sughrue Mion, PLLC

(57) ABSTRACT

A resin reservoir capable of storing the melted resin is provided in the pillar radially facing the pillar provided with the resin injection gate having a cross-sectional area larger than those of the other resin injection gates among a plurality of the pillars not provided with the resin injection gate or the pillar in the vicinity of the pillar facing the pillar provided with the resin injection gate having a cross-sectional area larger than those of the other resin injection gates among the plurality of the pillars not provided with the resin injection gate. A cross-sectional area of a communicating portion of the resin reservoir which communicates with the pillar is smaller than the smallest of cross-sectional areas of a plurality of the resin injection gates.

3 Claims, 11 Drawing Sheets

(51) Int. Cl.
    B29C 45/27    (2006.01)
    B29C 45/26    (2006.01)
    B29C 45/00    (2006.01)
    F16C 33/44    (2006.01)
    F16C 19/06    (2006.01)
    B29L 31/04    (2006.01)
    B29K 101/12   (2006.01)
    B29K 309/08   (2006.01)

(52) U.S. Cl.
    CPC ........ B29C 45/2669 (2013.01); F16C 33/416 (2013.01); F16C 33/44 (2013.01); B29C 45/2616 (2013.01); B29C 45/2628 (2013.01); B29C 2045/0006 (2013.01); B29C 2045/0027 (2013.01); B29C 2045/0044 (2013.01); B29K 2101/12 (2013.01); B29K 2309/08 (2013.01); B29L 2031/04 (2013.01); F16C 19/06 (2013.01); F16C 33/498 (2013.01); F16C 2208/04 (2013.01); F16C 2300/02 (2013.01)

(58) Field of Classification Search
    CPC . F16C 2220/04; B29C 45/00; B29C 45/0025; B29C 45/0046; B29C 45/2616; B29C 45/2628; B29C 45/2708; B29C 2045/0006; B29C 2045/0027; B29C 2045/0044; B29L 2031/04
    See application file for complete search history.

(56)         References Cited

U.S. PATENT DOCUMENTS 5,948,340 A      9/1999  Terada et al.
    2012/0121420 A1  5/2012  Yuki et al.
    2016/0108965 A1* 4/2016  Kokumai ................ F16C 19/06
                                                              384/463
    2016/0153496 A1  6/2016  Yuki et al.

FOREIGN PATENT DOCUMENTS

JP    H0677947 B2 * 10/1994 ......... B29C 45/2708
    JP    7-119104 A      5/1995
    JP    08197649 A  *  8/1996 ......... B29C 45/0025
    JP    10-281162 A    10/1998
    JP    10-318263 A    12/1998
    JP    2003-329044 A  11/2003
    JP    3652396 B2 *    5/2005 ......... B29C 45/0025
    JP    3666536 B2      6/2005
    JP    2007-321926 A  12/2007
    JP    2008-95770 A    4/2008
    JP    2011-85231 A    4/2011
    JP    2012-087890 A   5/2012
    JP    2012-092862 A   5/2012
    JP    2012-219917 A  11/2012
    JP    2012-236363 A  12/2012
    JP    2013-029164 A   2/2013
    JP    2013-228103 A  11/2013
    JP    2014087941 A *  5/2014 ............ F16C 33/416
    JP    5636868 B2     12/2014
    JP    2015-224664 A  12/2015
    JP    5994448 B2 *    9/2016 ............ F16C 33/416

OTHER PUBLICATIONS

Written Opinion dated May 17, 2016, issued by the International Searching Authority in International Application No. PCT/JP2016/055912 (PCT/ISA/237).
Communication from State Intellectual Property Office of People's Republic of China for corresponding Chinese patent application No. 201680082738.4 dated Jun. 4, 2019 English.

* cited by examiner

METHOD FOR MANUFACTURING BEARING CAGE

TECHNICAL FIELD

The present invention relates to a method for manufacturing a bearing cage.

BACKGROUND ART

In general, a bearing cage is manufactured by injection molding. Specifically, as shown in FIG. 11, a bearing cage is manufactured by forming a circular cavity 140 corresponding to a bearing cage which is a molded body in a mold, injecting a melted resin material (thermoplastic resin) from a resin injection gate 150 provided on a peripheral portion of the cavity 140, and cooling and solidifying.

The melted resin injected to the cavity 140 forms two flows and flows to two sides in a circumferential direction in the cavity 140, then merges at a position on an opposite side facing the resin injection gate 150 in a radial direction, and is joined to each other, thus a weld line 100W is formed. In general, it is well-known that since such an injection molded resin cage for a bearing is a cage in which the melted resin is fused and integrated, uniform mixing of the melted resin does not occur, and strength in the weld line 100W degrades.

In a case where reinforcing fiber materials such as glass fiber, carbon fiber, and metal fiber were added as reinforcement materials to the melted resin, since the reinforcing fiber materials are oriented perpendicular to a flow direction of the melted resin in the weld line 100W, a reinforcing effect does not appear. Further, in a part other than the weld line 100W, since the reinforcing fiber materials are oriented parallel to the flow direction of the melted resin, a difference in strength between the part and the weld line becomes large.

In this ways, the resin cage for a bearing manufactured by injection molding often breaks due to a weld line whose strength is weak. In particular, when the weld line is formed at a portion where stress is most liable to concentrate (for example, a bottom portion whose axial thickness is thinnest in a pocket or a curved portion at a corner where an annular portion intersects with a pillar), damage is liable to occur at this portion, and durability of the cage is impaired. Therefore, the following measures have been taken conventionally.

In a method for manufacturing a synthetic resin cage of Patent Document 1, gates are provided in a plurality of places in a circumferential direction of a cavity of a mold. Among a plurality of regions between the gates, a circumferential distance of some regions is longer than a circumferential distance of the other regions. Further, in a region where the circumferential distance is long, a resin reservoir is provided in a merging place of the injected resin material. As a result, the merging injected resin material flows from the cavity into the resin reservoir, so as to prevent degradation of the weld line strength.

In a resin cage of Patent Document 2, the total number of pockets is set to an odd number, and the number of pockets arranged between gates is set to a most equalized number. The resin reservoir is located in any one of the pillars on both sides of the pocket located at a circumferential center between the gates in which the pocket number is odd. As a result, a weld line formed in a region between the gates in which the pocket number is odd is formed in a position distant from a bottom portion of the pocket in a circumferential direction so as to improve rigidity of the cage.

In a method for manufacturing a resin cage for a bearing of Patent Document 3, at least one first resin reserving portion where a melted resin flows in before a weld line portion is formed in a cavity and at least one second resin reserving portion where a melted resin flows in after a weld line portion was formed in a cavity are provided at a peripheral portion of the cavity. Thus, by properly setting a position where the first resin reserving portion is provided, an occurrence position of the weld line portion is controlled so as to suppress formation of the weld line portion in a part where sufficient strength of the resin cage for a bearing is required. In addition, orientation of reinforcing fibers in the weld line portion is disturbed by the second resin reserving portion where the melted resin flows in after the weld line portion was formed so as to improve the strength of the weld line portion.

PRIOR ART DOCUMENT

Patent Document

Patent Document 1: Japanese Patent No. 3666536
Patent Document 2: JP-A-2008-095770
Patent Document 3: JP-A-2012-236363

SUMMARY OF THE INVENTION

Problems to be Solved by the Invention

In the manufacturing method described in Patent Document 1, a resin reservoir is provided at a position coinciding with a merging place of injected resin materials, that is, a weld line forming position. Therefore, in the vicinity of a communicating portion (opening portion) of the resin reservoir communicating with a cavity, reinforcing fiber materials are easily oriented perpendicular to a flow direction of the resin materials, and a weld line reinforcing effect cannot be obtained sufficiently.

In a resin cage described in Patent Document 2, since a weld line in which a melted resin was only welded and integrated to a pillar is formed in a region between gates in which no resin reservoir is provided and the number of pockets is even, it is possible that weld line strength becomes insufficient depending on use conditions.

In a method for manufacturing a resin cage for a bearing described in Patent Document 3, since first and second resin reserving portions are provided in a region between resin injection gates, a material cost of a melted resin increases.

The present invention has been made in view of the above-described problems, and an object thereof is to provide a method for manufacturing a bearing cage capable of suppressing strength degradation.

Means for Solving the Problems

The above object of the present invention is achieved by the following configuration.
(1) A method for manufacturing a bearing cage molded by injecting a melted resin into a cavity from a plurality of resin injection gates provided at a peripheral portion of a substantially annular cavity formed in a mold, wherein,
    the bearing cage includes
      a substantially annular base portion,
      a plurality and an even number of pillars projecting in an axial direction from an axial lateral surface of the base portion at a predetermined interval in a circumferential direction, and pockets whose number is equal to a number of the pillars formed by mutually facing surfaces of a pair of adjacent pillars and the axial lateral surface of the base portion, the resin injection gates are provided in half of a plurality of the pillars respectively, the pillar provided with the resin injection gate and the pillar not provided with the resin injection gate are arranged alternately in the circumferential direction, a cross-sectional area of one resin injection gate is larger than cross-sectional areas of the other resin injection gates among a plurality of the resin injection gates, a resin reservoir capable of storing the melted resin is provided in:

(a) the pillar radially facing the pillar provided with the resin injection gate having a cross-sectional area larger than those of the other resin injection gates among a plurality of the pillars not provided with the resin injection gate; or (b) the pillar in the vicinity of the pillar facing the pillar provided with the resin injection gate having a cross-sectional area larger than those of the other resin injection gates among the plurality of the pillars not provided with the resin injection gate, and a cross-sectional area of a communicating portion of the resin reservoir which communicates with the pillar is smaller than the smallest of cross-sectional areas of a plurality of the resin injection gates.

(2) The method for manufacturing a bearing cage described in (1), wherein, the cross-sectional area of one resin injection gate is larger than cross-sectional areas of the other resin injection gates among the plurality of the resin injection gates, and the other resin injection gates is configured such that a gate whose cross-sectional area is larger and a gate whose cross-sectional area is smaller are arranged alternately in the circumferential direction.

Effect of the Invention

According to the method for manufacturing the bearing cage of the present invention, a pressure gradient occurs in the cavity, and the melted resin flows from the resin injection gate whose cross-sectional area is large and pressure is high toward the resin reservoir whose pressure is low. Orientation of the reinforcing fiber materials oriented perpendicular (radial direction) to the flow direction (circumferential direction) upon the merger of melted resin is controlled by the flow of the melted resin and faces the circumferential direction. Therefore, the strength of the weld line is improved. As a result, it is possible to suppress strength degradation of the cage.

DESCRIPTION OF EMBODIMENTS

Hereinafter, embodiments of a method for manufacturing a bearing cage according to the present invention will be described in detail based on the drawings.

(First Embodiment)

Figure 1:
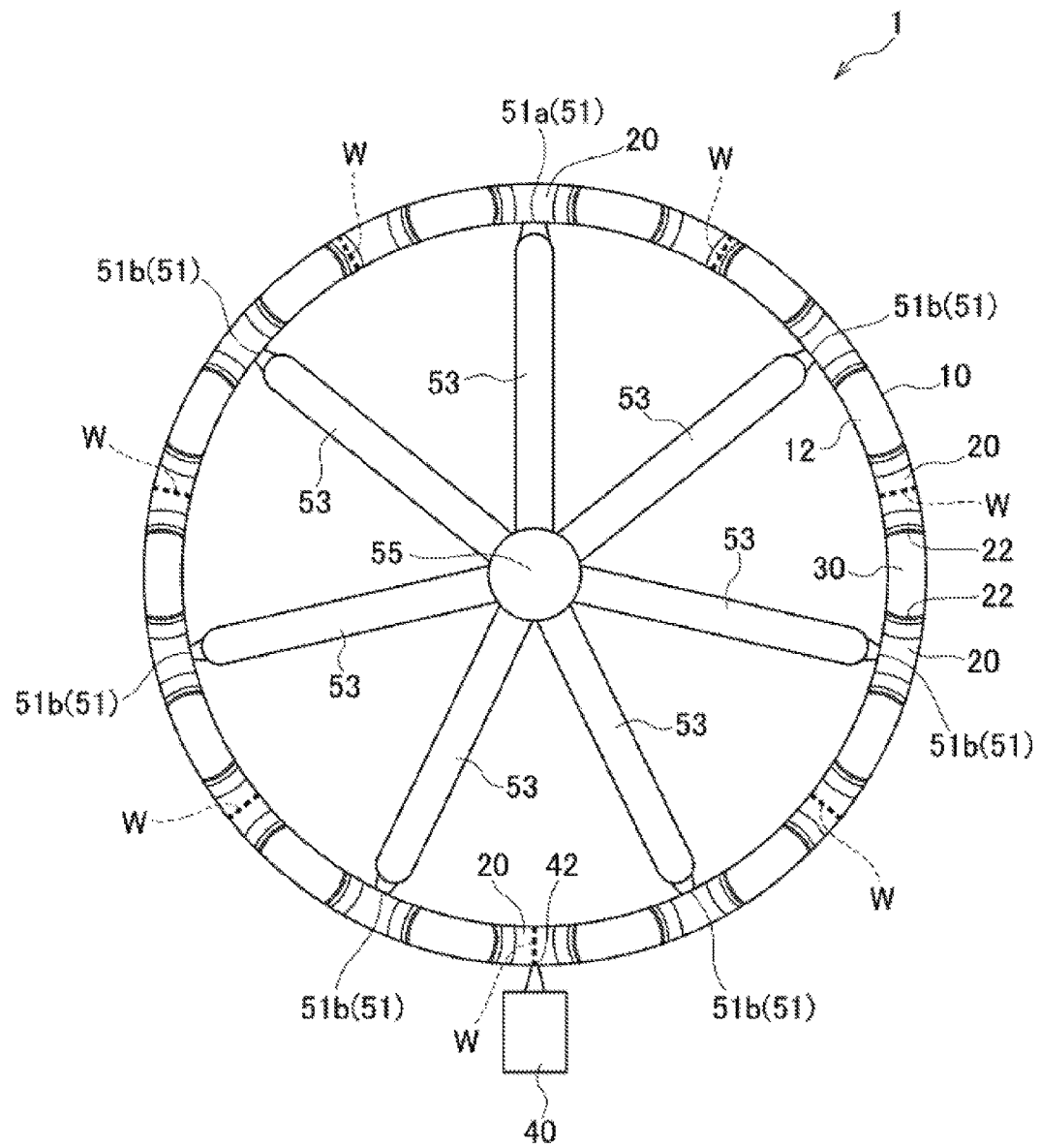
FIG. 1 is a plan view of a crown-shaped cage manufactured by a manufacturing method according to a first embodiment.

FIG. 1 shows a bearing cage 1 of this embodiment (hereinafter sometimes simply referred to as a cage). The cage 1 is a so-called crown-shaped cage, and includes a substantially annular base portion 10, a plurality and an even number (fourteen in this embodiment) of pillars 20 protruding in an axial direction at predetermined intervals in a circumferential direction from an axial lateral surface 12 of the base portion 10, and a plurality and an even number (fourteen in this embodiment) of pockets 30 holding rolling elements (not shown) of a bearing formed by mutually facing surfaces 22, 22 of a pair of adjacent pillars 20, 20 and the axial lateral surface 12 of the base portion 10. That is, the numbers of the pillars 20 and the pockets 30 are the same and a plurality and an even number of the pillars 20 and the pockets 30 are formed, and the pillars 20 are provided on both circumferential sides of respective pockets 30.

In a manufacturing method of such a cage 1, multi-point injection molding via gates is adopted. Specifically, the cage 1 is molded by injecting the melted resin added with reinforcing fiber materials into an annular cavity (not shown) formed in a mold from a plurality of resin injection gates (hereinafter simply referred to as gates.) 51 provided on an outer peripheral portion of the cavity, cooling and solidification. As resin materials, a resin composition is used, wherein 10 wt % to 50 wt % of reinforcing fiber materials (for example, glass fiber or carbon fiber.) was added to a resin such as polyamide resin such as 46 nylon or 66 nylon, polybutylene terephthalate, polyphenylene sulfide (PPS), polyether ether ketone (PEEK), and polyether nitrile (PEN). Although the cavity is not shown in FIG. 1, internal structure thereof is substantially the same as structure of the cage 1.

The melted resin is supplied to each gate 51 from a substantially cylindrical sprue 55 via substantially cylindrical runners 53 extending in the radial direction respectively. The sprue 55 extends in the axial direction substantially at a center of the cage 1 (cavity) and is connected to the runners 53. Therefore, the melted resin supplied from the sprue 55 reaches each gate 51 via each runner 53, and simultaneously flows into the cavity from each gate 51.

Gates 51 are provided in half (seven in this embodiment) of a plurality of pillars 20, respectively. Each gate 51 communicates with a circumferential center portion of an inner circumferential surface of the pillar 20 (cavity). A pillar 20 provided with a gate 51 and a pillar 20 not provided with a gate 51 are arranged alternately in the circumferential direction. In this way, by arranging a large number of gates 51 at equal intervals, circularity deformation of the cage 1 is suppressed, and high-precision rotation of the bearing is realized. Here, among a plurality of (seven) gates 51, a cross-sectional area of one gate 51 (hereinafter sometimes referred to as a large-diameter gate 51$a$) is larger than cross-sectional areas of the other gates 51 (hereinafter sometimes referred to as a small-diameter gate 51$b$).

A resin reservoir 40 capable of storing the melted resin is provided in a pillar 20 radially facing a pillar 20 provided with the large-diameter gate 51$a$ among a plurality of pillars 20 not provided with a gate 51. The resin reservoir 40 communicates with a circumferential center portion of an outer circumferential surface of the pillar 20 (cavity).

In such a configuration, the melted resin injected into the cavity from the gates 51 and flowing to both sides in the circumferential direction of the gates 51 merges between adjacent gates 51. Specifically, between the small-diameter gates 51$b$, the melted resin merges at a circumferential middle position between the small-diameter gates 51$b$, and a weld line W is formed at a circumferential middle portion of the pillar 20. On the other hand, between the large-diameter gate 51$a$ and the small-diameter gate 51$b$, the melted resin merges at a position shifted from the circumferential middle position toward the small-diameter gate 51$b$, and the weld line W is formed at a position shifted from the circumferential middle portion of the pillar 20 toward the small-diameter gate 51$b$. This is because an inflow amount of the melted resin from the large-diameter gate 51$a$ is larger than an inflow amount from the small-diameter gate 51$b$.

As will be described in detail later with reference to FIGS. 9 and 10, a state (see FIG. 9) before the melted resin injected from the gate 51 into the cavity merges is a state where pressure in the cavity is low. On the other hand, in a state (see FIG. 10) after the melted resin merged, since the inflow amount of the melted resin from the large-diameter gate 51$a$ is larger than the inflow amount from the small-diameter gate 51$b$, in the vicinity of the large-diameter gate 51$a$, pressure in the cavity becomes higher than that in other portions. In addition, in the resin reservoir 40, a region where the melted resin is not filled remains even after the melted resin merged, and internal pressure in the resin reservoir 40 is lower than that in other portions. Therefore, the pressure in the cavity lowers in a substantially annular shape from the large-diameter gate 51$a$ toward the resin reservoir 40. In this way, a pressure gradient occurs in the cavity, and flow of the melted resin occurs from the large-diameter gate 51$a$ having high pressure toward the resin reservoir 40 having low pressure. An orientation of the reinforcing fiber materials oriented perpendicular (radial direction) to a flow direction (circumferential direction) upon the merger of melted resin is controlled by the flow of the melted resin, and strength of the weld line W is improved. As a result, it is possible to suppress strength degradation of the cage 1. In addition, differently from a manufacturing method of Patent Document 3, since there is only one resin reservoir 40, material cost of the melted resin can be reduced.

Here, a cross-sectional area of a communicating portion 42 of the resin reservoir 40, which communicates with the pillar 20 and is an opening portion to the cavity, is smaller than the smallest area (a cross-sectional area of the small-diameter gate 51$b$ in this embodiment) among cross-sectional areas of a plurality of gates 51. According to this, since the melted resin starts to flow into the resin reservoir 40 after the melted resin merged and the weld line W was formed, an effect of controlling the orientation of the reinforcing fiber materials by forced flow of resin in the weld line W can appear more reliably.

(Second Embodiment)

Next, a method for manufacturing a bearing cage of a second embodiment according to the present invention will be described with reference to the drawings.

Figure 2:
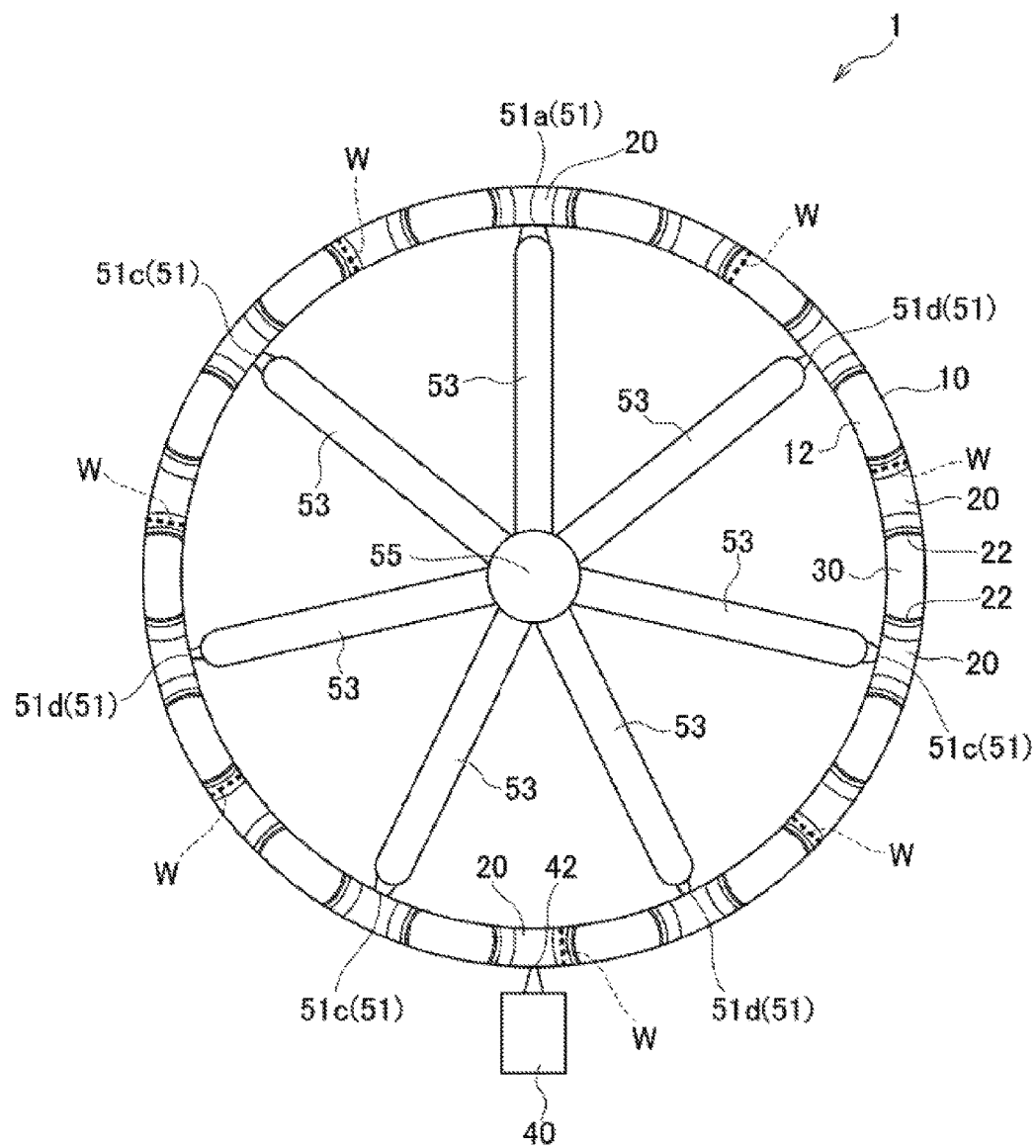
FIG. 2 is a plan view of a crown-shaped cage manufactured by a manufacturing method according to a second embodiment.

As shown in FIG. 2, this embodiment is the same as the first embodiment in that among a plurality of (seven) gates 51, a cross-sectional area of one gate 51 (hereinafter sometimes referred to as a large-diameter gate 51$a$) is larger than cross-sectional areas of the other gates 51. On the other hand, this embodiment is different from the first embodiment in that for the other gates 51, a gate having a large cross-sectional area (hereinafter sometimes referred to as a medium-diameter gate 51$c$) and a gate having a small cross-sectional area (hereinafter sometimes referred to as a small-diameter gate 51$d$) are arranged alternately in a circumferential direction.

In such a configuration, the melted resin injected into a cavity from the gates 51 and flowing to both sides in the circumferential direction of the gates 51 merges between adjacent gates 51. Here, the melted resin merges at positions shifted from circumferential middle positions of adjacent gates 51 toward the gates 51 having a small cross-sectional area, and the weld lines W are formed at the merging positions.

Specifically, between the large-diameter gate 51$a$ and the small-diameter gate 51$d$, the melted resin merges at a position shifted from the circumferential middle position toward the small-diameter gate 51$d$, and a weld line W is formed in a pocket 30 on a small-diameter gate 51$d$ side. Between the small-diameter gate 51$d$ and the medium-diameter gate 51$c$, the melted resin merges at a position shifted from the circumferential middle position toward the small-diameter gate 51$d$, and the weld line W is formed at a position shifted from the circumferential middle portion of the pillar 20 toward the small-diameter gate 51$b$. Between the medium-diameter gate 51$c$ and the large-diameter gate 51$a$, the melted resin merges at a position shifted from the circumferential middle position toward the medium-diameter gate 51$c$, and the weld line W is formed at a position shifted from the circumferential middle portion of the pillar 20 toward the medium-diameter gate 51$c$.

According to this configuration, as in the first embodiment, pressure in the cavity decreases from the large-diameter gate 51$a$ toward the resin reservoir 40. In this way, a pressure gradient occurs in the cavity, and flow of the melted resin occurs from the large-diameter gate 51$a$ having high pressure toward the resin reservoir 40 having low pressure. An orientation of the reinforcing fiber materials oriented perpendicular (radial direction) to a flow direction (circumferential direction) upon the merger of melted resin is controlled by the flow of the melted resin, and strength of the weld line W is improved. As a result, it is possible to suppress strength degradation of the cage 1.

Furthermore, in this embodiment, forced flow of the melted resin occurs in a direction where a cross-sectional area of a flow path enlarges toward the resin reservoir 40 in some of the weld lines W. Therefore, since a region where a fiber orientation was disordered in the weld line W moves to a part having a large cross-sectional area, an effect of further improving strength of the weld line W is obtained. Other configurations are the same as those of the above embodiment, and the same effect as those of the above embodiment can be exerted.

(Third Embodiment)

Next, a method for manufacturing a bearing cage of a third embodiment according to the present invention will be described with reference to the drawings.

Figure 3:
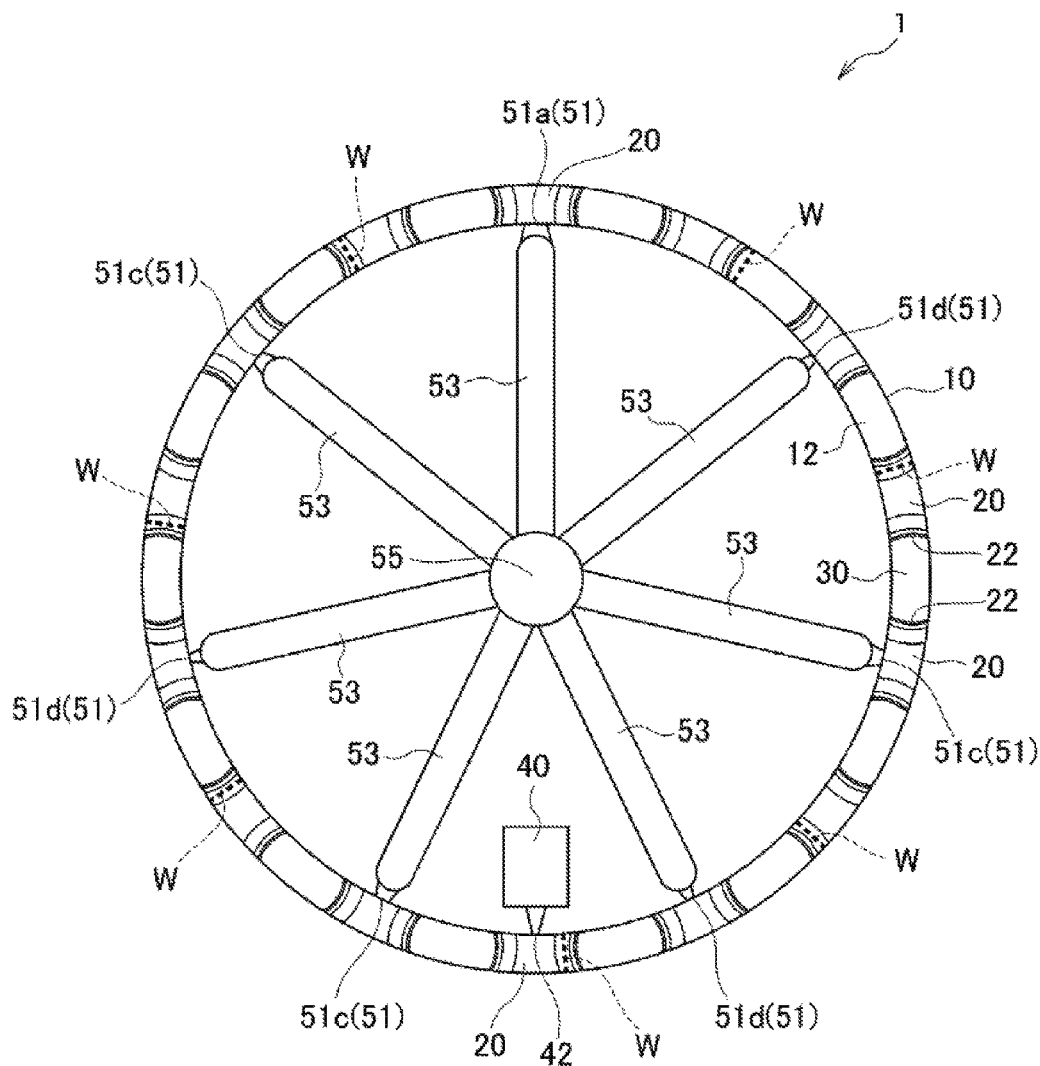
FIG. 3 is a plan view of a crown-shaped cage manufactured by a manufacturing method according to a third embodiment.

As shown in FIG. 3, this embodiment is different from the second embodiment in that a resin reservoir 40 is provided on an inner circumferential surface of a pillar 20. Other configurations are the same as those of the second embodiment, and the same effects as those of the second embodiment can be exerted.

(Fourth Embodiment)

Next, a method for manufacturing a bearing cage of a fourth embodiment according to the present invention will be described with reference to the drawings.

Figure 4:
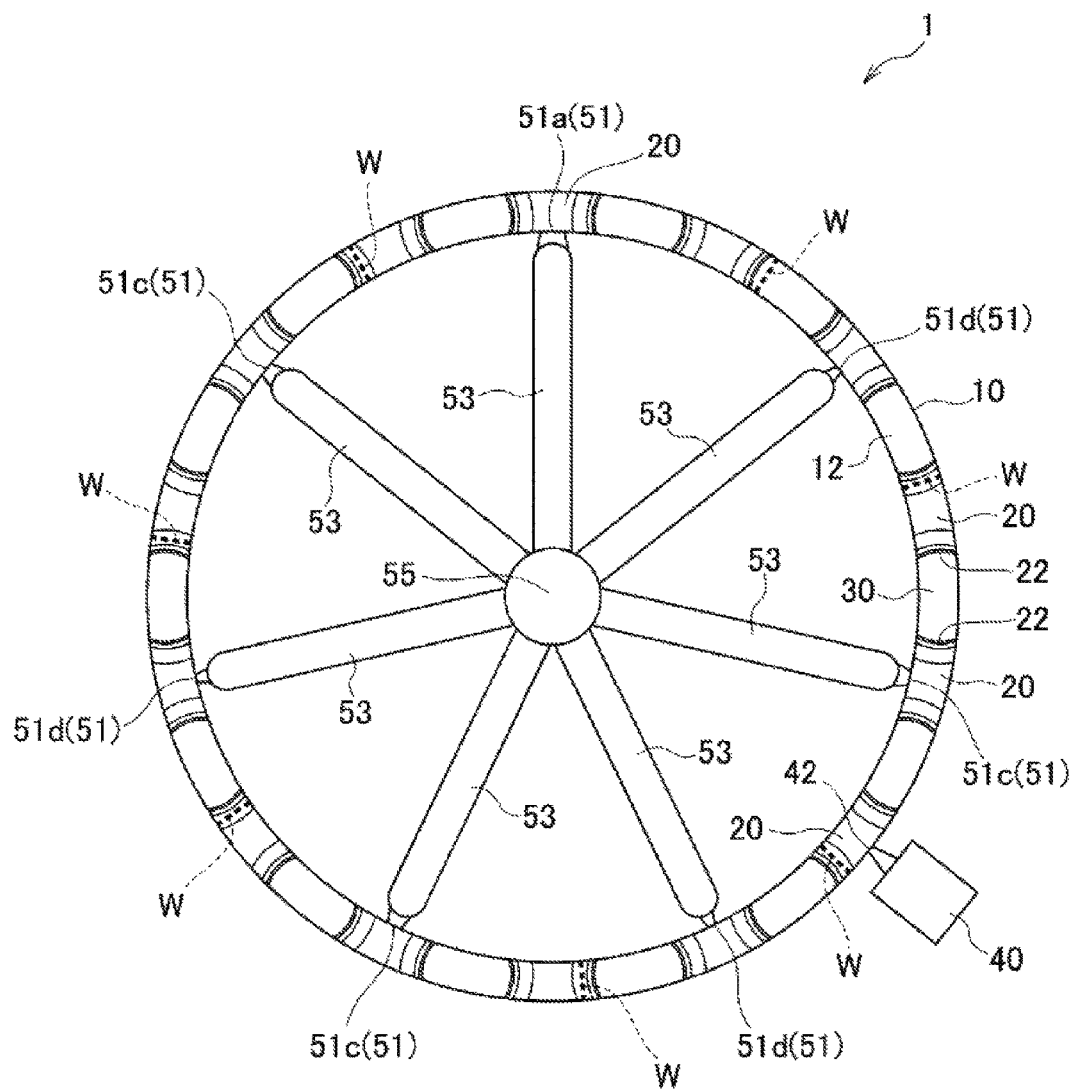
FIG. 4 is a plan view of a crown-shaped cage manufactured by a manufacturing method according to a fourth embodiment.

As shown in FIG. 4, a resin reservoir 40 capable of storing the melted resin is provided in a pillar 20 in the vicinity of a pillar 20 radially facing a pillar 20 provided with a large-diameter gate 51a having a cross-sectional area larger than those of the other gates 51 (medium-diameter gate 51c and small-diameter gate 51d) among a plurality of pillars 20 not provided with a gate 51. Even with such a configuration, it is possible to exert the same effects as those of the second and third embodiments. In this embodiment, the resin reservoir 40 may be provided on an inner circumferential surface of the pillar 20.

(Fifth Embodiment)

Next, a method for manufacturing a bearing cage of a fifth embodiment according to the present invention will be described with reference to the drawings.

Figure 5:
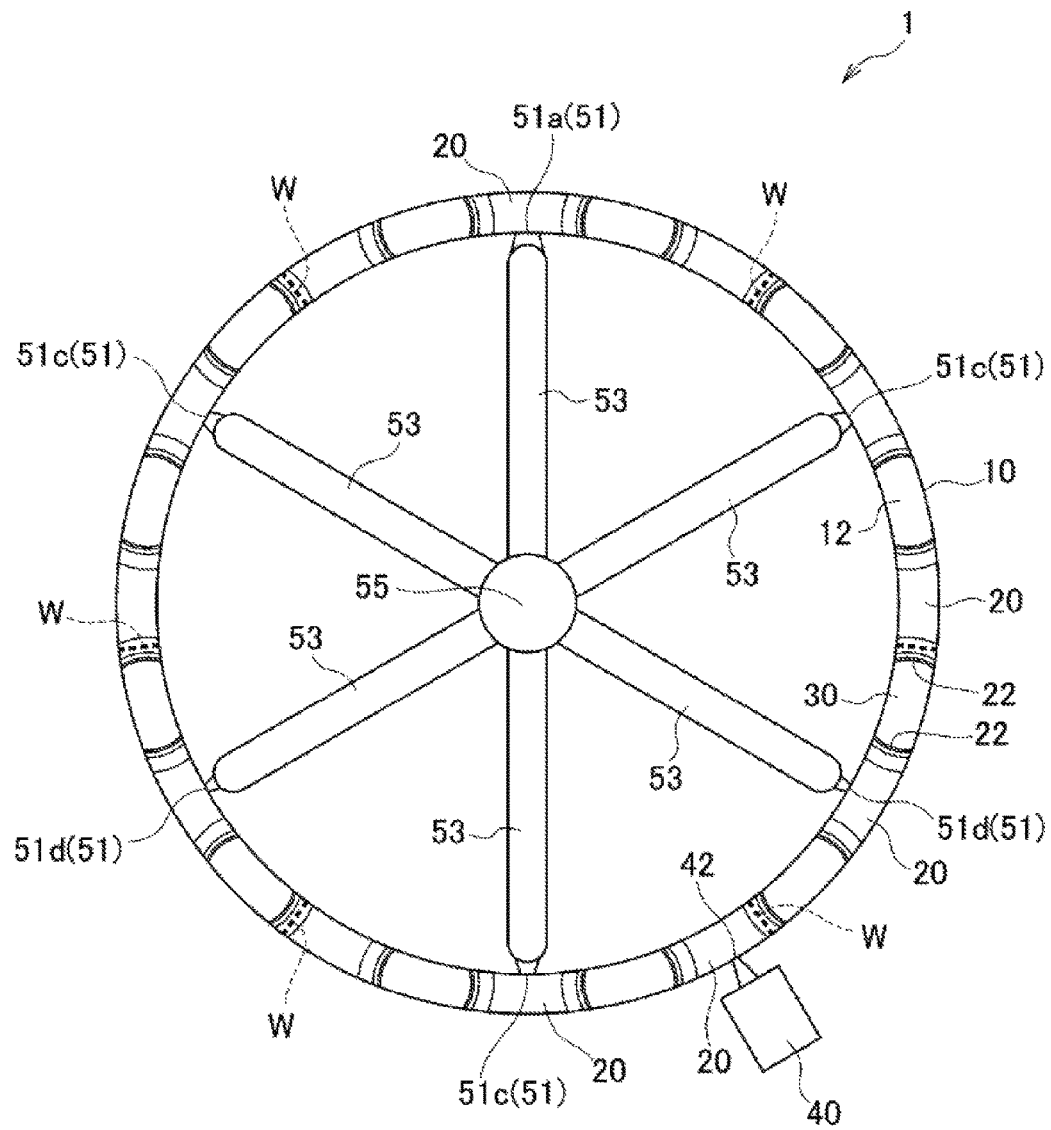
FIG. 5 is a plan view of a crown-shaped cage manufactured by a manufacturing method according to a fifth embodiment.

As shown in FIG. 5, in this embodiment, the numbers of pillars 20 and pockets 30 are twelve. Gates 51 are respectively provided in six pillars 20, which are half of twelve pillars 20. A pillar 20 provided with a gate 51 and a pillar 20 not provided with a gate 51 are arranged alternately in the circumferential direction. Among the six gates 51, a cross-sectional area of one gate 51 (large-diameter gate 51a) is larger than cross-sectional areas of the other gates 51. For the other gates 51, a gate having a large cross-sectional area (medium-diameter gate 51c) and a gate having a small cross-sectional area (small-diameter gate 51d) are arranged alternately in the circumferential direction. In addition, a resin reservoir 40 capable of storing the melted resin is provided in a pillar 20 in the vicinity of a pillar 20 radially facing a pillar 20 provided with the large-diameter gate 51a among a plurality of pillars 20 not provided with a gate 51.

According to this configuration, as in the above embodiment, pressure in the cavity decreases from the large-diameter gate 51a toward the resin reservoir 40. In this way, a pressure gradient occurs in the cavity, and flow of the melted resin occurs from the large-diameter gate 51a having high pressure toward the resin reservoir 40 having low pressure. An orientation of the reinforcing fiber materials oriented perpendicular (radial direction) to a flow direction (circumferential direction) upon the merger of melted resin is controlled by the flow of the melted resin, and strength of the weld line W is improved. As a result, it is possible to suppress strength degradation of the cage 1.

Furthermore, in this embodiment, forced flow of the melted resin occurs in a direction where a cross-sectional area of a flow path enlarges toward the resin reservoir 40 in some of the weld lines W. Therefore, since a region where a fiber orientation was disordered in the weld line W moves to a part having a large cross-sectional area, an effect of further improving strength of the weld line W is obtained. Other configurations are the same as those of the above embodiment, and the same effect as those of the above embodiment can be exerted. In this embodiment, the resin reservoir 40 may be provided on an inner circumferential surface of the pillar 20.

In this way, a method for manufacturing the bearing cage of the present invention is not limited to the above-described crown-shaped cage, and can be applied to various kinds of cages such as a comb-shaped cage. Hereinafter, an embodiment where the method for manufacturing the bearing cage of the present invention is applied to a comb-shaped cage will be described.

(Sixth Embodiment)

Next, a method for manufacturing a bearing cage of a sixth embodiment according to the present invention will be described with reference to the drawings.

Figure 6:
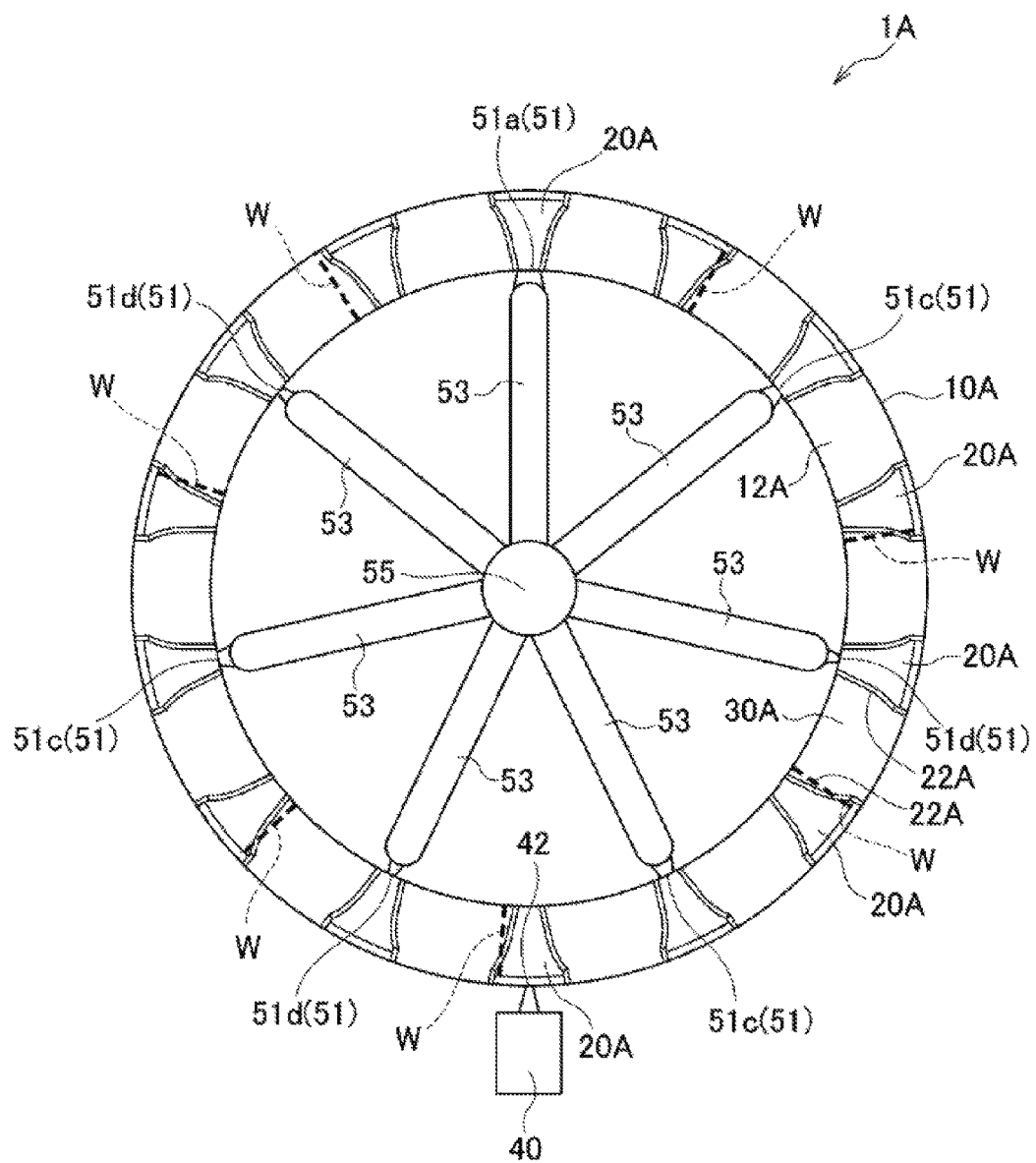
FIG. 6 is a plan view of a crown-shaped cage manufactured by a manufacturing method according to a sixth embodiment.

FIG. 6 shows a bearing cage 1A of this embodiment (hereinafter sometimes simply referred to as a cage). The cage 1A is a so-called comb-shaped cage, and includes a substantially annular base portion 10A, a plurality and an even number (fourteen in this embodiment) of pillars 20A protruding in an axial direction at predetermined intervals in a circumferential direction from an axial lateral surface 12A of the base portion 10A, and a plurality and an even number (fourteen in this embodiment) of pockets 30A holding rolling elements (not shown) of a bearing formed by mutually facing surfaces 22A, 22A of a pair of adjacent pillars 20A, 20A and the axial lateral surface 12A of the base portion 10A. That is, the numbers of the pillars 20A and the pockets 30A are the same and a plurality and an even number of the pillars 20A and the pockets 30A are formed, and the pillars 20A are provided on both circumferential sides of respective pockets 30A.

Even in such a comb-shaped cage 1A, the same manufacturing method as in the above embodiment can be applied. That is, gates 51 are respectively provided in seven pillars 20A, which are half of fourteen pillars 20A. A pillar 20A provided with a gate 51 and a pillar 20A not provided with a gate 51 are arranged alternately in the circumferential direction. Among the seven gates 51, a cross-sectional area of one gate 51 (large-diameter gate 51a) is larger than cross-sectional areas of the other gates 51. For the other gates 51, a gate having a large cross-sectional area (medium-diameter gate 51c) and a gate having a small cross-sectional area (small-diameter gate 51d) are arranged alternately in the circumferential direction. In addition, a resin reservoir 40 capable of storing the melted resin is provided in a pillar 20A radially facing a pillar 20A provided with the large-diameter gate 51a among a plurality of pillars 20A not provided with a gate 51.

According to this configuration, as in the above embodiment, pressure in the cavity decreases from the large-diameter gate 51a toward the resin reservoir 40. In this way, a pressure gradient occurs in the cavity, and flow of the melted resin occurs from the large-diameter gate 51a having high pressure toward the resin reservoir 40 having low pressure. An orientation of the reinforcing fiber materials oriented perpendicular (radial direction) to a flow direction (circumferential direction) upon the merger of melted resin is controlled by the flow of the melted resin, and strength of the weld line W is improved. As a result, it is possible to suppress strength degradation of the cage 1.

Furthermore, in this embodiment, forced flow of the melted resin occurs in a direction where a cross-sectional area of a flow path enlarges toward the resin reservoir 40 in some of the weld lines W. Therefore, since a region where a fiber orientation was disordered in the weld line W moves to a part having a large cross-sectional area, an effect of further improving strength of the weld line W is obtained.

In addition, in this embodiment, the weld line W is formed in the vicinity of an R portion at a corner where the base portion 10A and the pillar 20A intersect. However, since forced flow of the melted resin occurs in a direction where the weld line W is away from the vicinity of the R portion at the corner, an effect of improving strength of the weld line W can be further improved. Other configurations are the same as those of the above embodiment, and the same effect as those of the above embodiment can be exerted.

(Seventh Embodiment)

Next, a method for manufacturing a bearing cage of a seventh embodiment according to the present invention will be described with reference to the drawings.

Figure 7:
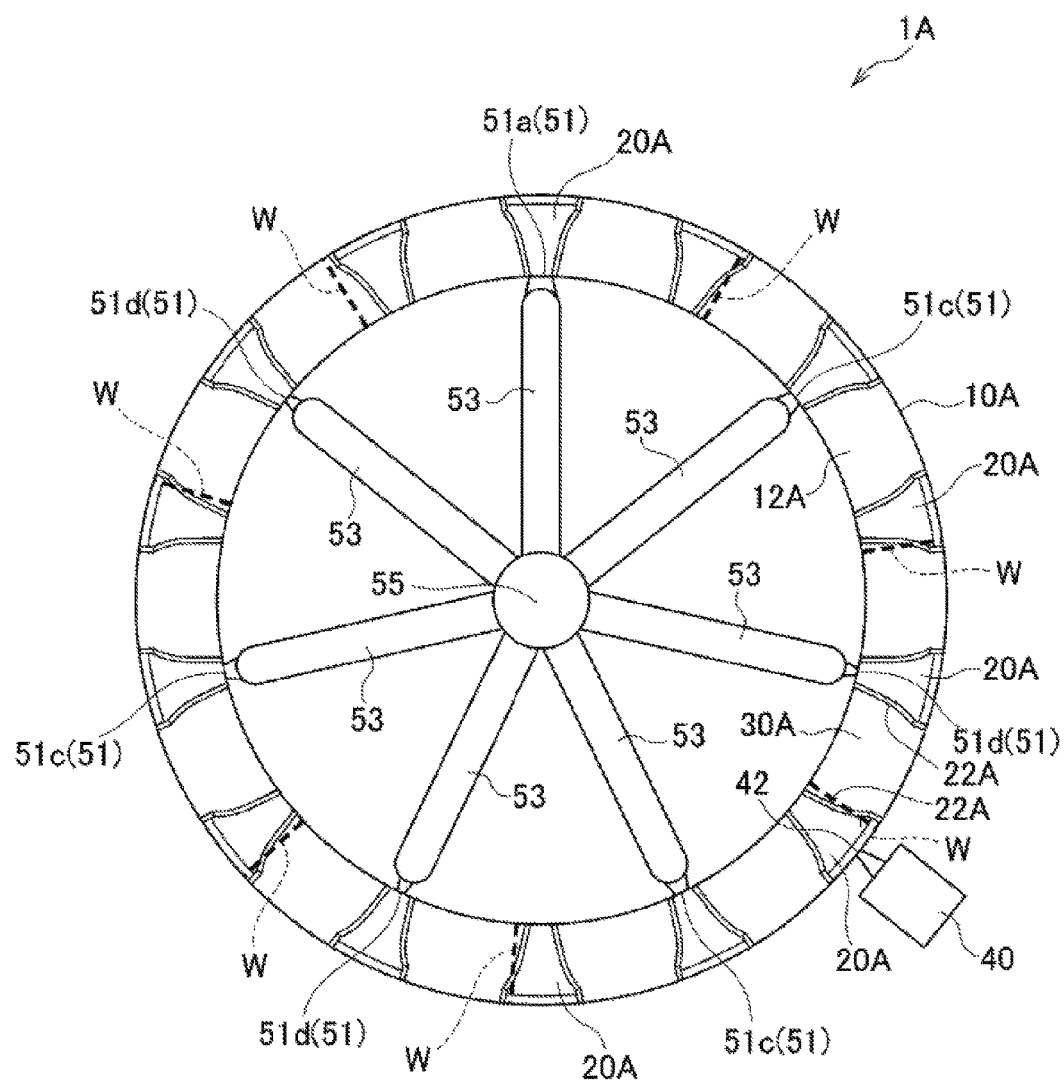
FIG. 7 is a plan view of a crown-shaped cage manufactured by a manufacturing method according to a seventh embodiment.

As shown in FIG. 7, a resin reservoir 40 capable of storing the melted resin is provided in a pillar 20A in the vicinity of a pillar 20A radially facing a pillar 20A provided with a large-diameter gate 51a having a cross-sectional area larger than those of the other gates 51 (medium-diameter gate 51c and small-diameter gate 51d) among a plurality of pillars 20A not provided with a gate 51. Even with such a configuration, it is possible to exert the same effects as those of the above embodiment. In this embodiment, the resin reservoir 40 may be provided on an inner circumferential surface of the pillar 20A.

(Eighth Embodiment)

Next, a method for manufacturing a bearing cage of an eighth embodiment according to the present invention will be described with reference to the drawings.

Figure 8:
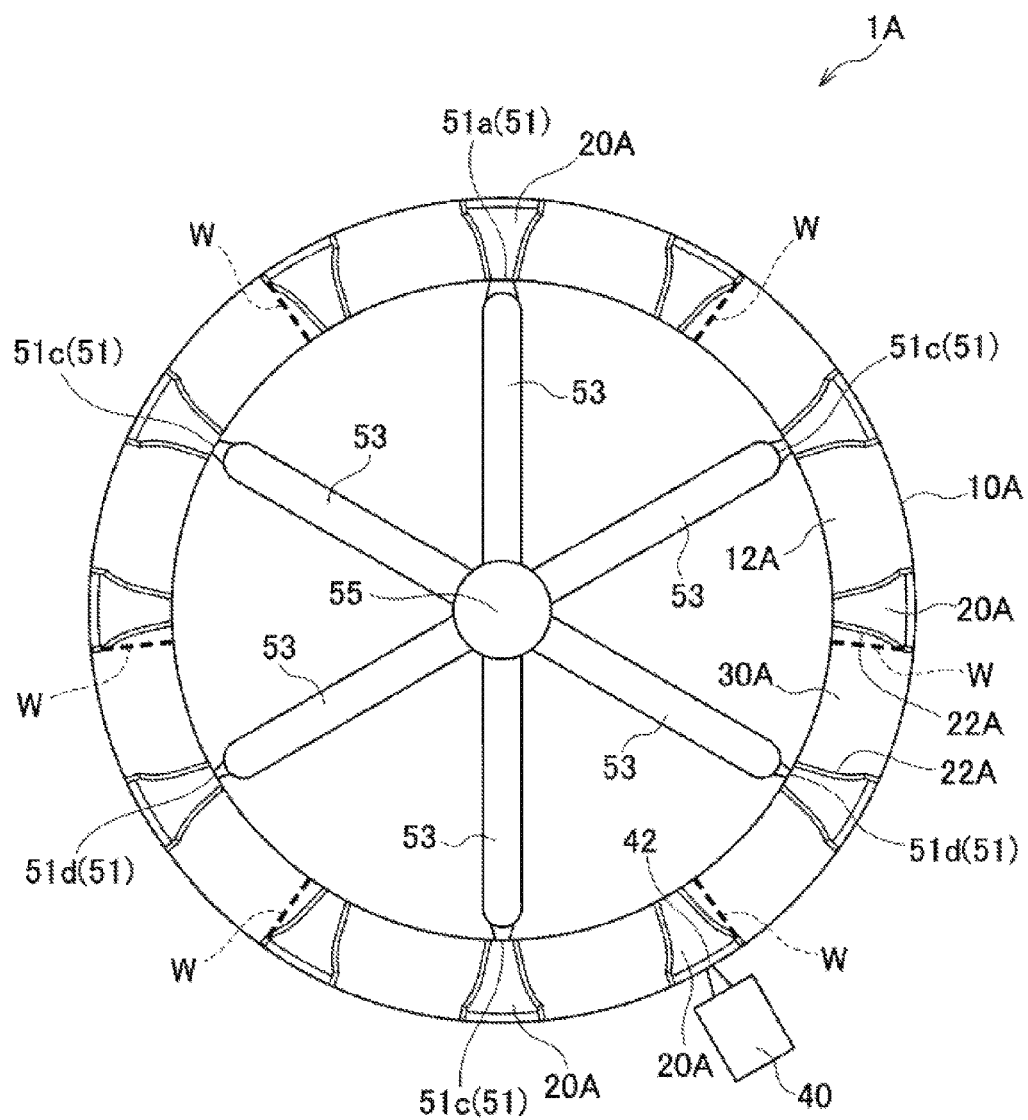
FIG. 8 is a plan view of a crown-shaped cage manufactured by a manufacturing method according to an eighth embodiment.

As shown in FIG. 8, the numbers of pillars 20A and pockets 30A are twelve in this embodiment. Gates 51 are respectively provided in six pillars 20A, which are half of twelve pillars 20A. A pillar 20A provided with a gate 51 and a pillar 20A not provided with a gate 51 are arranged alternately in the circumferential direction. Among the six gates 51, a cross-sectional area of one gate 51 (large-diameter gate 51a) is larger than cross-sectional areas of the other gates 51. For the other gates 51, a gate having a large cross-sectional area (medium-diameter gate 51c) and a gate having a small cross-sectional area (small-diameter gate 51d) are arranged alternately in the circumferential direction. In addition, a resin reservoir 40 capable of storing the melted resin is provided in a pillar 20A in the vicinity of a pillar 20A radially facing a pillar 20A provided with the large-diameter gate 51a among a plurality of pillars 20A not provided with a gate 51.

Even with such a configuration, it is possible to exert the same effects as those of the above embodiment. In this embodiment, the resin reservoir 40 may be provided on an inner circumferential surface of the pillar 20A.

EXAMPLE

Next, a pressure distribution in a cavity when a melted resin is injected from a gate 51 into the cavity will be described.

Figure 9:
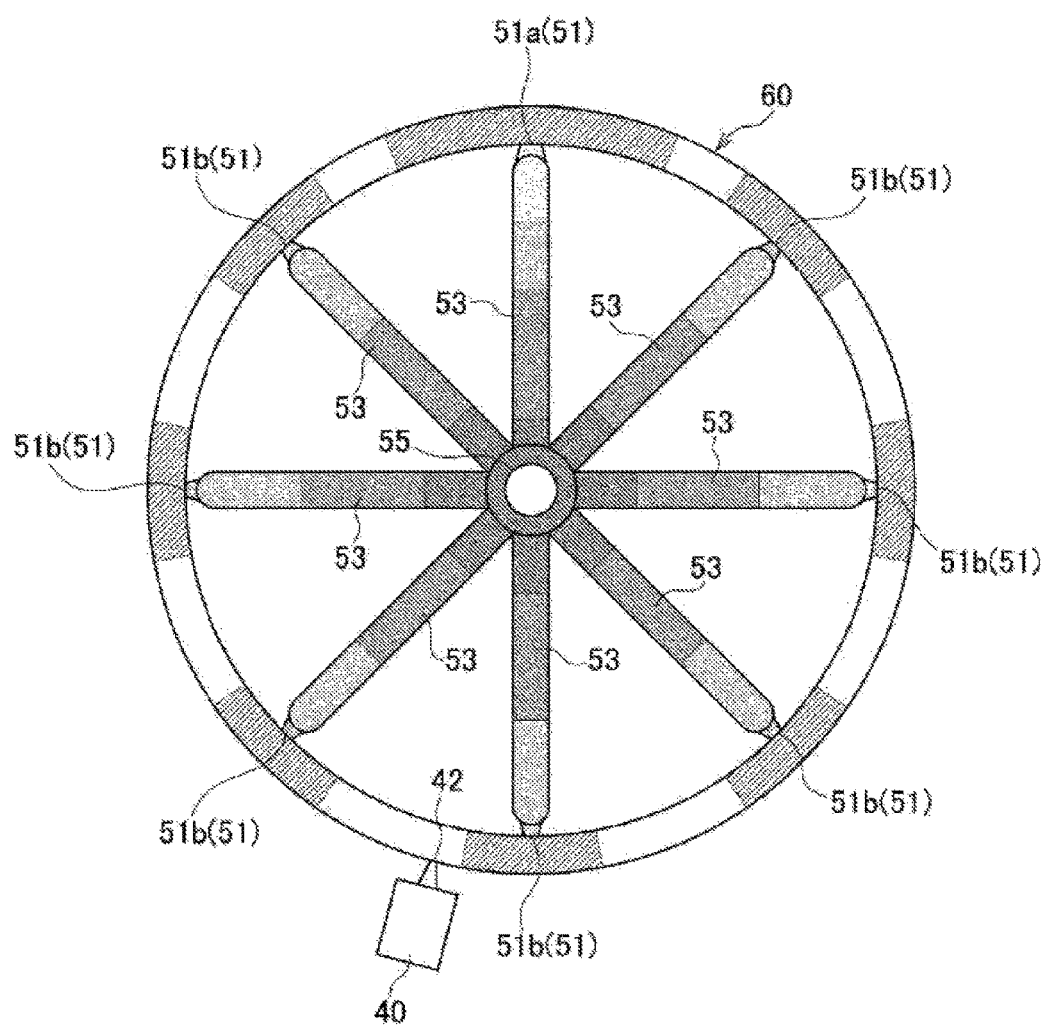
FIG. 9 is a view showing a pressure distribution in a state before a melted resin merges.
Figure 10:
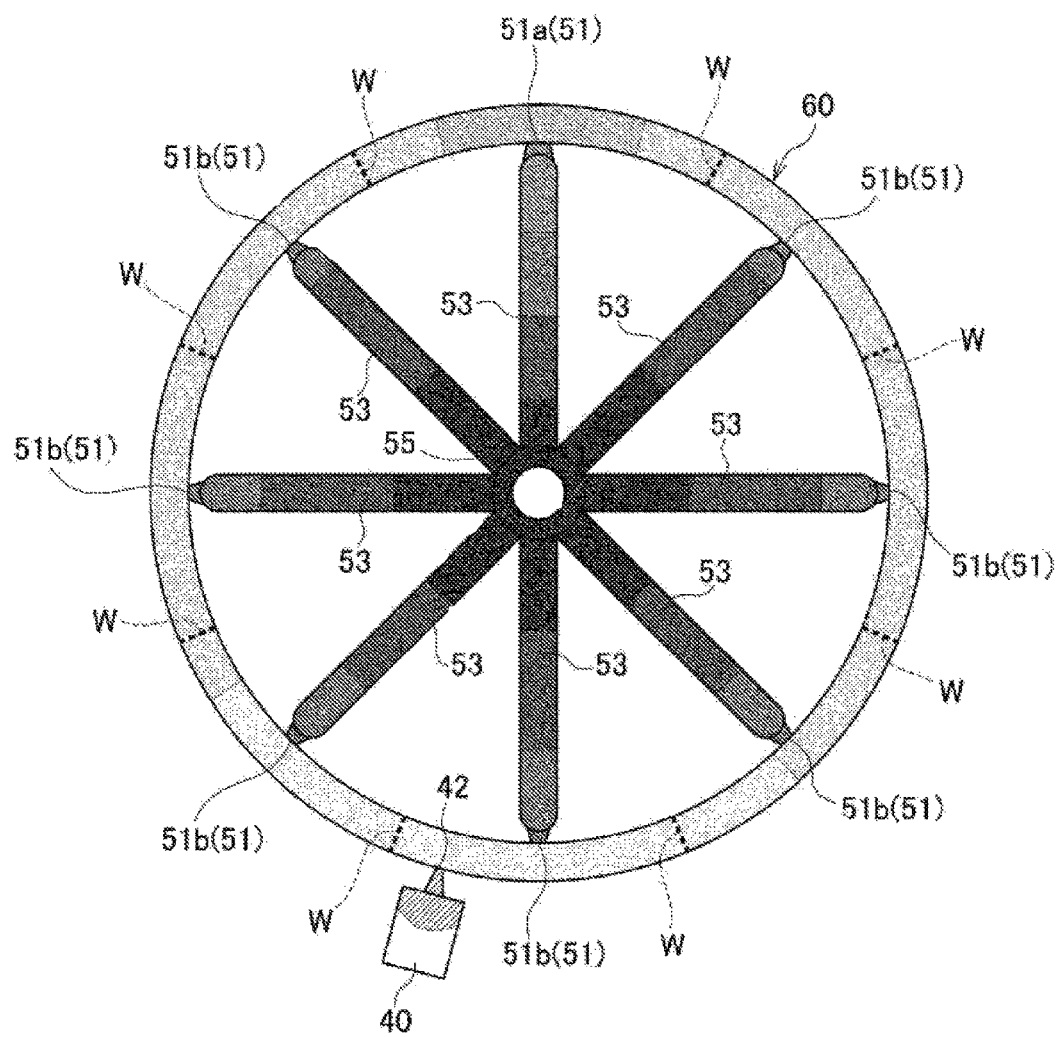
FIG. 10 is a view showing a pressure distribution in a state after the melted resin merges.
Figure 11:
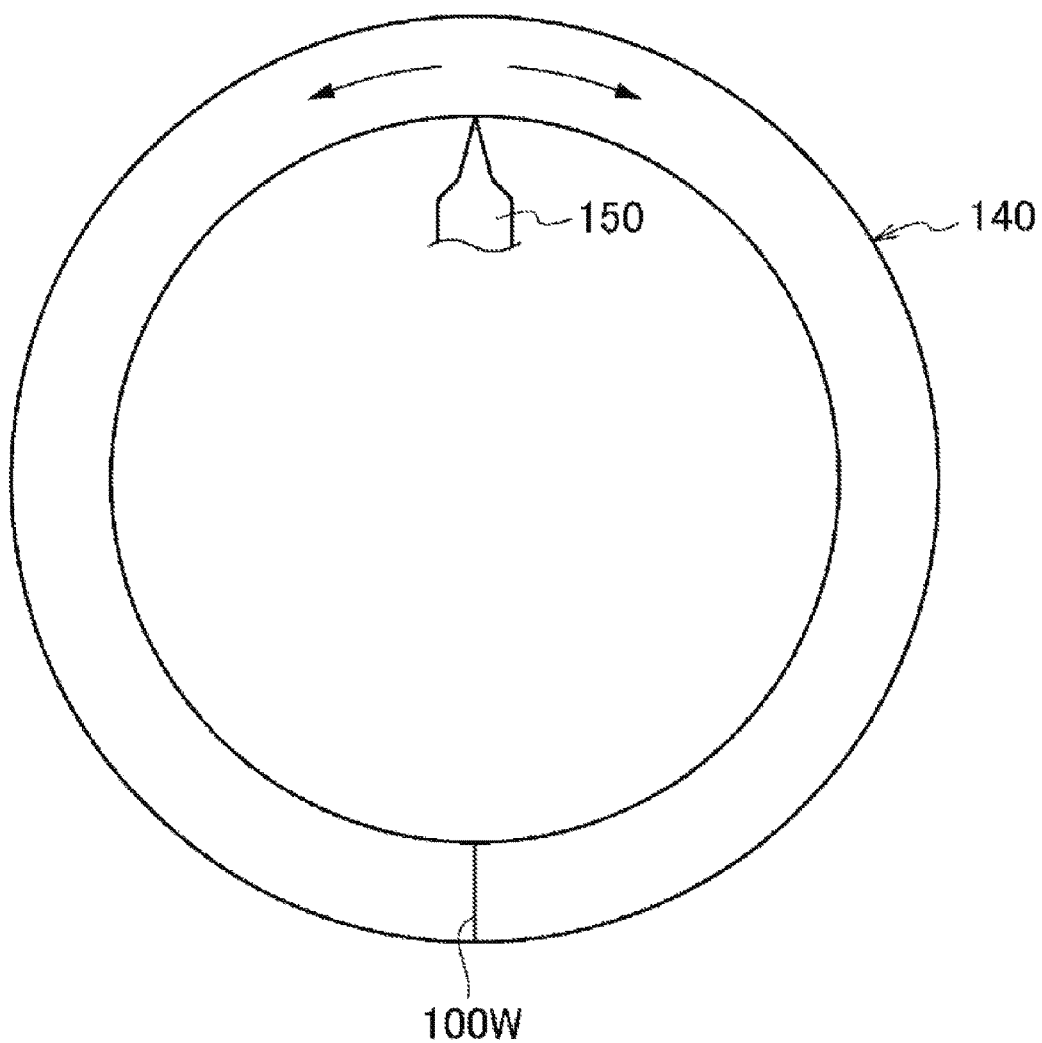
FIG. 11 is a cross-sectional view of a mold used in a method for manufacturing a conventional bearing cage.

As shown in FIGS. 9 and 10, in this example, as the fourth to fifth embodiments (see FIGS. 4 to 5) or the seventh to eighth embodiments (see FIGS. 7 to 8), a configuration will be described as an example where a resin reservoir 40 capable of storing the melted resin is provided in a pillar 20 (20A) in the vicinity of a pillar 20 (20A) radially facing a pillar 20 (20A) provided with a large-diameter gate 51a among a plurality of pillars 20 (20A) not provided with a gate 51.

Although not shown in FIGS. 9 and 10, in this example, the numbers of pillars 20 (20A) and pockets 30 (30A) are sixteen, and gates 51 are respectively provided in eight pillars 20 (20A), which are half of sixteen pillars 20 (20A). Among eight gates 51, a cross-sectional area of one gate 51 (large-diameter gate 51a) is larger than cross-sectional areas of the other gates 51 (small-diameter gate 51b).

In FIGS. 9 and 10, a level of pressure due to the melted resin is shown by a shade of hatching. As shown in FIG. 9, a state before the melted resin injected from the gate 51 into the cavity 60 merges is a state in which pressure in the cavity 60 is low. On the other hand, as shown in FIG. 10, in a state after the melted resin merged, since an inflow amount of the melted resin from the large-diameter gate 51a is larger than an inflow amount of the melted resin from the small-diameter gate 51b, in the vicinity of the large-diameter gate 51a, pressure in the cavity 60 becomes higher than that in other portions. In addition, in the resin reservoir 40, a region where the melted resin is not filled remains even after the melted resin merged, and internal pressure in the resin reservoir 40 is lower than that in other portions. Therefore, the pressure in the cavity 60 lowers from the large-diameter gate 51a toward the resin reservoir 40. In this way, a pressure gradient occurs in the cavity 60, and flow of the melted resin occurs from the large-diameter gate 51a having high pressure toward the resin reservoir 40 having low pressure. Orientation of the reinforcing fiber materials oriented perpendicular (radial direction) to the flow direction (circumferential direction) upon the merger of melted resin is controlled by the flow of the melted resin and faces the circumferential direction. Therefore, strength of a weld line W is improved. As a result, it is possible to suppress strength degradation of the cage 1.

The present invention is not limited to the above-described embodiments, and can be appropriately modified, improved, or the like.

In this way, a method for manufacturing the bearing cage of the present invention is not limited to the above-described crown-shaped cage 1, and can be applied to various kinds of cages such as a comb-shaped cage.

In addition, since the bearing cage of the present invention has a little strength degradation and excellent durability, it is appropriate to apply the bearing cage to a rolling bearing. That is, since such a rolling bearing includes a plurality of rolling elements provided between an inner ring, an outer ring, and an inner ring and an outer ring, and a bearing cage excellent in durability which keeps the rolling elements rolling freely in pockets, it is possible to meet requirements such as high-speed rotation and high load.

DESCRIPTION OF REFERENCE NUMERALS 1, 1A bearing cage
10, 10A base portion
12, 12A axial lateral surface
20, 20A pillar
22, 22A facing surface
30, 30A pocket
40 resin reservoir
42 communicating portion
51 resin injection gate
51a large-diameter gate
51b small-diameter gate 51c medium-diameter gate
51d small-diameter gate
53 runner
55 sprue
60 cavity
W weld line

The invention claimed is:

1. A method for manufacturing a bearing cage molded by injecting a melted resin into a cavity from a plurality of resin injection gates provided at a peripheral portion of a substantially annular cavity formed in a mold, wherein,
the bearing cage includes
a substantially annular base portion,
a plurality and an even number of pillars projecting in an axial direction from an axial lateral surface of the base portion at a predetermined interval in a circumferential direction, and
pockets whose number is equal to a number of the pillars formed by mutually facing surfaces of a pair of adjacent pillars and the axial lateral surface of the base portion,
the resin injection gates are provided in half of a plurality of the pillars respectively,
the pillar provided with the resin injection gate and the pillar not provided with the resin injection gate are arranged alternately in the circumferential direction,
a cross-sectional area of one resin injection gate is larger than cross-sectional areas of the other resin injection gates among a plurality of the resin injection gates,
a resin reservoir capable of storing the melted resin is provided in:
(a) the pillar radially facing the pillar provided with the resin injection gate having a cross-sectional area larger than those of the other resin injection gates among a plurality of the pillars not provided with the resin injection gate; or
(b) the pillar in the vicinity of the pillar facing the pillar provided with the resin injection gate having a cross-sectional area larger than those of the other resin injection gates among the plurality of the pillars not provided with the resin injection gate, and
a cross-sectional area of a communicating portion of the resin reservoir which communicates with the pillar is smaller than the smallest of cross-sectional areas of a plurality of the resin injection gates.

2. The method for manufacturing a bearing cage according to claim 1, wherein,
the other resin injection gates is configured such that a gate whose cross-sectional area is larger and a gate whose cross-sectional area is smaller are arranged alternately in the circumferential direction.

3. A bearing cage manufactured by the method for manufacturing the bearing cage according to claim 1.

* * * * *